(12) United States Patent
Ellringmann et al.

(10) Patent No.: US 9,988,558 B2
(45) Date of Patent: Jun. 5, 2018

(54) REPULPABLE ADHESIVES

(75) Inventors: Kai Ellringmann, Hamburg (DE);
Stefan Wulf, Mönchengladbach (DE);
Kristin Kerber, Hamburg (DE)

(73) Assignee: tesa SE, Norderstedt (DE)

( * ) Notice: Subject to any disclaimer, the term of this patent is extended or adjusted under 35 U.S.C. 154(b) by 264 days.

(21) Appl. No.: 12/560,514

(22) Filed: Sep. 16, 2009

(65) Prior Publication Data

US 2010/0065207 A1 Mar. 18, 2010

(30) Foreign Application Priority Data

Sep. 18, 2008 (DE) .................. 10 2008 047 966

(51) Int. Cl.
*C09J 1/00* (2006.01)
*C09J 4/00* (2006.01)
*C09J 11/04* (2006.01)
*C08K 3/32* (2006.01)

(52) U.S. Cl.
CPC .................. *C09J 4/00* (2013.01); *C09J 11/04* (2013.01); *C08K 3/32* (2013.01); *Y10T 156/109* (2015.01); *Y10T 428/2852* (2015.01)

(58) Field of Classification Search
USPC ............... 156/298, 325; 106/287.24, 287.29; 423/317; 428/355 R
See application file for complete search history.

(56) References Cited

U.S. PATENT DOCUMENTS

| 6,596,819 B2 * | 7/2003 | Morikawa et al. ........... 525/457 |
| 2005/0143552 A1 * | 6/2005 | Ikeda et al. ..................... 528/49 |
| 2006/0207736 A1 * | 9/2006 | Boettcher et al. ............. 162/112 |
| 2008/0153951 A1 * | 6/2008 | Ellringmann et al. ........ 524/138 |

FOREIGN PATENT DOCUMENTS

| DE | 196 28 317 A1 | 1/1998 | |
| DE | 198 30 674 A1 | 1/2000 | |
| DE | 199 02 179 A1 | 8/2000 | |
| DE | 199 58 223 A1 | 7/2001 | |
| DE | 100 58 956 A1 | 6/2002 | |
| DE | 101 23 981 A1 | 1/2003 | |
| DE | 102 10 192 A1 | 10/2003 | |
| DE | 102 58 667 A1 | 7/2004 | |
| DE | 102 004 028312 A1 | 12/2005 | |
| DE | 102 005 051181 A1 | 4/2007 | |
| EP | 1 935 956 A2 | 6/2008 | |
| JP | 09137149 A * | 5/1997 | ............ C08G 18/18 |
| WO | WO 9713819 A1 * | 4/1997 | |
| WO | 2003/020623 A1 | 3/2003 | |
| WO | 2003/024850 A1 | 3/2003 | |

* cited by examiner

*Primary Examiner* — Daniel H Lee

(74) *Attorney, Agent, or Firm* — Norris McLaughlin & Marcus, P.A.

(57) ABSTRACT

The invention relates to a repulpable adhesive comprising orthophosphoric acid, to adhesive tapes comprising at least one layer of such an adhesive, and to the use of adhesive tapes of this kind.

12 Claims, No Drawings

REPULPABLE ADHESIVES

The invention relates to repulpable adhesives intended more particularly for adhesive bonding to filler-containing materials.

One established method of offering repulpable adhesives lies in the preparation of (meth)acrylic acid polymers or acrylate copolymers comprising acrylic acid and at least one acrylate and/or methacrylate comonomer, such as alkyl acrylate, alkyl methacrylate, 2-ethoxalyloxyethyl methacrylates, 2-ethoxyethyl acrylate, hexaethyl methacrylate, ethylhexyl acrylate, butyl acrylate, isooctyl acrylate or the like. Where appropriate, the polymer may also include other, free-radically copolymerizable comonomers such as vinylcaprolactam, vinyl acetate or the like.

This base polymer can be and is typically blended with resins and/or plasticizers in order to allow tailoring of the adhesive properties of the resulting (pressure-sensitive) adhesive. The components added are ideally water-soluble or water-dispersible, and may be not only of low molecular mass but also of high molecular mass kind.

The rheological profile of the adhesive is set by controlled crosslinking of the base polymer. Employed in this context are not only crosslinking reagents with a covalent action (isocyanates, epoxides, hydrazines, amines) but also crosslinking reagents with an ionic action [aluminium(III), titanium(IV), cerium(IV)].

In contact with filler-containing papers, however, repulpable (pressure-sensitive) adhesives prepared in this way, whose principal application lies in products for the papermaking and paper-processing industries, frequently exhibit a significant drop in their adhesive properties, which can go as far as the complete loss of bond strength and tack. Filler-containing substrates, more particularly papers, may give off polyvalent metal ions as a result of ageing processes or external influences. A problem arises in particular through the calcium ions that are frequently present in the paper, or in substances with which the paper has been treated, since calcium is a filler and constituent in coating slips that is commonplace in the paper industry and whose use in that industry is on the increase.

The loss of properties on the part of the (pressure-sensitive) adhesive can be attributed in particular to a migration of the metal ions into the adhesive. The carboxyl-containing and/or acid-containing copolymers, with their controlled crosslinking, may in this way undergo uncontrolled post-crosslinking to beyond the desired extent. This post-crosslinking leads to an adverse effect on the rheological profile, such as to cause a massive increase in the cohesion and, in tandem with this, a reduction in the tack, which in the worst-case scenario goes as far as the complete loss of bond strength and tack.

For application in the paper-processing industry in particular, as for example in connection with flying splice, therefore, a strict profile of requirements is imposed on the adhesive tapes that are to be used (splicing tape). In the processing of flat web material, more particularly of paper, splicing on the fly is a common method of replacing an old reel that is almost fully unwound with a new reel, without having to stop the high-speed machines in order to accomplish this. Flying splices of this kind are frequently carried out using pressure-sensitive adhesive tapes to join the end of the old web to the start of the new web. Accordingly these adhesive tapes must—over the entire duration of the application—possess a high tack, effective cohesion, and good repulpability [the capacity to be introduced into the pulp, in other words the paper or fibre slurry suspended or dissolved in water, in the reprocessing of (waste) paper; not automatically synonymous with "water solubility"].

EP 1 935 956 A2 discloses adhesives admixed with, for example, chelating agents, ion-exchange substances, molecular sieves and/or precipitants for the purpose of scavenging metal ions, more particularly calcium ions. Among species added to the adhesive are phosphates or polyphosphates. These additives, though, have the disadvantage that they reduce the tack as compared with the unadditized base adhesives, thus making the adhesive less "sticky". This effect is observed in particular in the freshly additized adhesives ("fresh specimens").

Tack is the capacity of a (pressure-sensitive) adhesive to produce instantaneous adhesion to numerous materials, the tack more particularly also being a function of the active pressure. In quantitative terms, the tack can be described, for example, by means of the rolling-ball tack (see later on below, Experimental Section, Measurement Methods, test C). Pressure-sensitive adhesives possess a permanent tack.

It is an object of the invention to offer an adhesive which exhibits an even further increased stability over time in terms of its adhesive properties in the context of adhesive bonds to filler-containing materials, more particularly with regard to tack, than is given by the adhesives disclosed in EP 1 935 956 A2.

It has been possible to achieve this object, surprisingly, through the addition of orthophosphoric acid as an additive to the adhesives, more particularly pressure-sensitive adhesives. The long-term suitability of repulpable (pressure-sensitive) adhesives for adhesive tapes where the (pressure-sensitive) adhesive is in contact with materials containing metal ions, more particularly calcium(II) ions, such as corresponding paper supports, for example, has more particularly been significantly improved by such addition.

The main claim, accordingly, provides a repulpable adhesive comprising orthophosphoric acid. The invention further provides a repulpable adhesive tape which is equipped with at least one layer of an adhesive to which orthophosphoric acid has been added.

Any reference below merely to "phosphoric acid" should be understood to mean orthophosphoric acid [$H_3PO_4$ or, written differently, $(HO)_3P(O)$].

The purpose of adding the phosphoric acid is to bind, and hence scavenge, metal ions, more particularly alkaline earth metal ions, especially calcium(II) ions and/or magnesium(II) ions.

Particularly for application of the adhesive for adhesive bonding to papers, which typically have a more or less high calcium(II) ion content, orthophosphoric acid is of advantage, and is suitable of "deactivating" these very $Ca^{2+}$ ions.

In addition to the phosphoric acid it is possible for further additives to be added to the (pressure-sensitive) adhesive, more particularly those additives as disclosed in EP 1 935 956 A2 as metal ion binder additives. It may be very advantageous, moreover, to use mixtures of two or more additives, or mixtures of one or more additives with further substances, in addition to the phosphoric acid.

The phosphoric acid is added to the adhesive preferably in an amount of up to 10% by weight, more preferably in an amount of 2% to 5% by weight, based on the pure phosphoric acid content of the (pressure-sensitive) adhesive. The phosphoric acid may be added as a solid, as an aqueous solution or as a solution in organic solvents (such as acetone, for example) or else as a solution in a mixture of water and organic solvents. Any solvents present can be removed outstandingly by an adhesive drying operation such as often occurs in any case in the processing of adhesives.

Adhesives used are, in particular, (pressure-sensitive) adhesives containing vinyl-carboxylic acid, more particularly acrylic acid and/or methacrylic acid (the vinylcarboxylic acids are present in the pressure-sensitive adhesive more particularly in the form of copolymerized comonomers, but may also be present in a free form, especially as comonomer residues). The vinylcarboxylic acid fraction (more particularly acrylic acid fraction) in the pressure-sensitive adhesive may in particular amount to more than 20% by weight, or even to more than 50% by weight. Even for adhesives whose vinylcarboxylic acid fraction (more particularly acrylic acid fraction) was more than 70% and even 80% by weight, the additization of the invention has proved to be very advantageous.

Repulpability for the purposes of this specification means that the repulpable product (adhesive or adhesive tape) is repulpable according to the TAPPI UM 213 measurement method (TAPPI Useful Methods 213, TAPPI 1991, ISBN 0898522064).

The adhesive of the invention is one which is repulpable as per the aforementioned TAPPI UM 213 measurement method when subjected to measurement in the form of a test specimen whose adhesive coatweight after drying is 40 g/m$^2$ and which is produced as follows:
preparing a 30% strength solution of the (pressure-sensitive) adhesive for measurement in a 1:1:1 mixture of water, isopropanol and acetone
coating the solution onto siliconized release paper
conditioning at room temperature for 120 minutes
drying the resultantly produced swatch specimens at 100° C. for 20 minutes
laminating these specimens to a paper support (from Drewsen SPEZIALPAPIERE GmbH & Co. KG; trade name of the paper: "PRODURA Basispapier mit hoher Spaltfestigkeit" [PRODURA base paper with high split resistance])
preparation for measurement: conditioning of the specimens at 23° C. and 50% relative humidity for 3 days each.

Thereafter the TAPPI UM 213 test is performed with the specimens thus prepared.

The adhesive tapes of the invention may be both single-sided and double-sided adhesive tapes.

The adhesive tapes of the invention are repulpable in accordance with the aforementioned TAPPI UM 213 measurement method.

The invention further provides for the use of the adhesive tapes as described above for adhesively bonding filler-containing materials, more particularly materials containing calcium(II) and/or magnesium(II) ions. Emphasis may be given here more particularly to the use of the (pressure-sensitive) adhesive tapes of the invention for the adhesive bonding of $Ca^{2+}$- and/or $Mg^{2+}$-containing papers and/or of papers which have the aforementioned ions in the prime coat (primer).

The (pressure-sensitive) adhesive tapes of the invention can be used to outstanding effect in the paper industry in the context of a permanent bond. A further possible use lies in the area of static or flying splice, in order to join expiring paper webs to their new counterparts, and in a particularly favourable way can be used even in those cases where the problems depicted in this specification occur with alkaline earth metal ions, more particularly with calcium(II) ions. In adhesive tapes of this kind a splittable paper is frequently used as backing material, and parts the adhesive bond in the course of roll change, by splitting of the paper.

With particular advantage, therefore, the adhesive tape of the invention can be employed as splicing tape.

Accordingly the adhesive tape of the invention may be configured more particularly in the form of an adhesive tape of the kind depicted, for instance, in the specifications DE 196 28 317 A, DE 198 30 674 A, DE 199 02 179 A, DE 199 58 223 A, DE 100 58 956, DE 101 23 981, WO 03/20623 A, WO 03/24850 A, DE 102 10 192 A, DE 102 58 667, DE 10 2004 028 312 A, DE 10 2005 051 181 A, to name but a few examples of inventively advantageous embodiments. With particular advantage, the adhesive additized with phosphoric acid can be employed for the layers which come into contact with a paper support, more particularly with the splitting paper support.

The invention further provides a method of eliminating metal ions, more particularly alkaline earth metal ions, and especially calcium ions, from adhesives, especially from pressure-sensitive adhesives, by admixing the (pressure-sensitive) adhesive with phosphoric acid. Reference is made correspondingly to the proportions and quantities specified above.

Surprisingly it has emerged that, through the additization, the adhesive properties of the adhesives, especially of the pressure-sensitive adhesives, have not only not been impaired, but that it has in fact been possible to achieve a significant improvement in the long-term properties, as compared with the phosphate-containing adhesives of EP 1 935 956 A2. In contrast, a person skilled in the art would have expected the trapping of the metal ions inwardly migrating into the adhesive from the material to be bonded (for example, the $Ca^{2+}$ ions inwardly migrating from a paper) to occur in the interface-side layer of the adhesive, and for the adhesive to be adhesively "deactivated", so to speak, as a result of the trapped ions accumulating at the interface, in the form, for example, of the compounds of low solubility formed. Unexpectedly, however, this was not found.

With the adhesive of the invention success has been achieved in producing repulpable adhesive tapes which can be used to bond papers containing calcium carbonate as an inorganic constituent in the topcoat even more effectively than using the adhesive tapes depicted in EP 1 935 956 A2, including more particularly the adhesive tapes additized therein with phosphates and/or phosphorus-containing compounds. This is the case even when calcium carbonate is the exclusive inorganic constituent or is present in the topcoat in very high fractions. The adhesive bonding of such a paper remains stable over long periods. It has been found that the additization of the adhesives stabilizes the original profile of properties at a high level over a prolonged application period. A significant advantage of the compositions additized with phosphoric acid arises from the fact that the pressure-sensitive adhesive properties, more particularly the tack, expressed through the rolling-ball tack measurement, immediately after additization, remain at the same level or approximately the same level as that of the unadditized compositions. The compositions additized with phosphates, as known from EP 1 935 956 A2, in contrast, as a result of the additization, showed a significant influencing of the pressure-sensitive adhesive properties. It was found, moreover, that the pressure-sensitive adhesive properties remained even more stable than in the case of the adhesives disclosed in EP 1 935 956 A2.

With regard to the additives not containing phosphorus, EP 1 935 956 A2 does not disclose any values, which makes direct comparison more difficult here. It is expected that there is an improvement in the (long-term) adhesive properties even in relation to those adhesives. At least, however, the adhesives of the present specification additized with orthophosphoric acid represent an effective—and easy-to-realize—alternative, which it was not obvious to infer from that specification. Indeed, in relation to all adhesives with phosphorus-containing additization, the present adhesives additized with orthophosphoric acid show an improved behaviour, as has already been set out above.

The pressure-sensitive adhesive of the invention and the pressure-sensitive adhesive tapes of the invention are suitable more particularly for fields of application where what is important is that the tack remains constant or approximately constant over a long time period. This is relevant more particularly in the area of the permanent adhesive bonding of paper. In that case the adhesive tape remains on the substrate for a long time and, without implementation of the present invention, shows the negative effects described at the outset, on the basis more particularly of exposure to disruptive metal ions, such as $Ca^{2+}$ ions, for example.

EXPERIMENTAL SECTION

In laboratory experiments it has been shown that the additization of conventional pressure-sensitive adhesives, especially pressure-sensitive adhesives of high acrylic acid content (i.e. having a high fraction of acrylic acid in the comonomer composition for polymerizing the adhesive; investigated here using pressure-sensitive adhesives having acrylic acid fractions of 50% by weight or more), in a range up to 10% by weight of orthophosphoric acid had no significant influence on the bond strengths, demonstrated experimentally through the bond strengths to steel and to a label paper. The tack does not increase until the top additization range of the mixing range specified above. Additization in an amount from 2% to 5% by weight has proved to be optimum, more particularly in the range of 3±1% by weight. The elastic component (in %) when measuring the microshear travel, which represents a measure of the network density, remained at a good level. This test is used to test the shear strength of adhesive tapes under a temperature load of 40° C.

In long-term measurements of unadditized adhesives and adhesives blended with a weight fraction of 3% with orthophosphoric acid, the effect of ageing stabilization was investigated. This was done by applying samples of each of the stated adhesives to papers that contained calcium carbonate fractions of 5%, 10%, 15%, 50% and 100% by weight in their slip coat. The higher the fraction of calcium ions, the faster the ageing of the adhesives in terms of their adhesive properties (tack, bond strengths to steel and label paper, microshear travel determination, holding powers). Following additization with 3% by weight of orthophosphoric acid, the ageing behaviour was significantly improved for papers of high calcium content. On measurements with calcium fractions of 5% and 10% by weight in the paper slip coat, it was in fact found, over a measurement of 40 days, that there were no significant deteriorations in the bond strengths.

Through the results of the long-term measurements, therefore, it has emerged that the additization of the invention provides a significant improvement in the storage stability of the pressure-sensitive adhesive in contact with materials containing (alkaline earth) metal ions, more particularly calcium ions, with the bond strength and the tack remaining at a good level even over a relatively long period.

EXAMPLES

Example 1

Reference Composition 1

599 g of a 30% strength solution of a free-radically polymerized scaffold polymer consisting of 47% acrylic acid, 48% butyl acrylate and 5% vinylcaprolactam in a 1:1:1 mixture of water, isopropanol and acetone were blended with 397 g of polyoxy-ethylene(15)cocoamine (trade name Ethomeen C-25, Akzo; CAS No. 61791-14-8) and 0.70 g of the bisglycidyl ether of bisphenol A (bisphenol A epichlorohydrin Mw <700; trade name Epikote 828 LVEL, Hexion, CAS No. 25068-38-6). The scaffold polymer is further characterized by a mass-average molar mass Mg of $9 \cdot 10^5$ g/mol and a polydispersity of 8.

2: (Base Polymer from Example 1 with Additive)

The composition described in Example 1 is additionally blended with 17.3 g of diammonium hydrogen phosphate.

Example 3

Base Polymer from Example 1 with Additive

The composition described in Example 1 is additionally blended with 17.3 g of a commercially available preparation of sodium polyphosphate and alkylphosphonate with a high complexing action (trade name Kappafos D11, manufacturer: Kapp-Chemie, calcium-binding capacity of 120 mg CaO/g according to manufacturer).

Example 4

Inventive Composition 1 (Base Polymer from Example 1 with Additive)

The composition described in Example 1 is additionally blended with 17.3 g of orthophosphoric acid.

Example 5

Reference Composition 2

5.1 Preparation of a Hydrophilic Scaffold Polymer

A vacuum-tight steel polymerization apparatus with a capacity of 2 l, fitted with reflux condenser, anchor stirrer, heating jacket and metering apparatus, is charged with 315 g of acrylic acid, 112.5 g of 2-ethylhexyl acrylate, 250 g of acetone, 100 g of ethanol and 100 g of water. Following evacuation, flushing with N2 and heating to 62° C., a solution of 0.6 g of 2,2-azobis(2-methylbutyronitrile) in 6.4 g of acetone is introduced with stirring into the reaction medium, which boils at 600 hPa. The polymerization begins, with a slowly falling boiling temperature and an increase in viscosity. After a reaction time of 30 minutes, at 58° C., a further 0.5 g of 2,2-azobis(2-methylbutyronitrile) is supplied, in solution in a mixture of 75 g of acetone, 50 g of ethanol and 50 g of water, and the pressure is raised to 700 hPa. After a further 60 minutes and a further increase in viscosity, at 60° C., a further 75 g of acetone, 50 g of ethanol and 50 g of water are added, and the pressure is increased to 800 hPa. Further dilution is carried out after 120 minutes at 63° C. and approximately 1000 hPa (atmospheric pressure) with 75 g of acetone, 50 g of ethanol and 50 g of water.

Under these conditions the polymerization is continued with boiling of the solution for 60 minutes. Thereafter, at 62° C. (atmospheric pressure), a solution of 22.5 g of SPA in 127.5 g of demineralized water is metered in simultaneously with a solution of 1.5 g of bis(4-tert-butylcyclohexyl) peroxydicarbonate in 13.5 g of acetone, the two additions taking place continuously to the boiling polymer solution, with distribution of the feeds over a period of 120 minutes. Thereafter the reaction is taken to its end at a reaction temperature of 62° C. and, after a total reaction time of 20 h, the batch is cooled to RT. During the entire time, any quantities of $O_2$ present are removed from the reaction mixture by drawing a weak stream of N2 through it under suction. The polymer solution obtained is water-clear. The polymer content is 32.42% by weight. The relative viscosity, measured in absolute methanol at 25° C., is 3.363.

5.2 Preparation of a Repulpable Pressure-Sensitive Adhesive 92.54 g (30 g of polymer) of the polymer solution prepared in accordance with 5.1 are mixed with 67.25 g of an ethoxylated liquid primary coconut fatty amine. In the case of this plasticizing compound, the hydrogen atoms of the amino group have been substituted completely by ethoxy chains. The total number of ethoxy units per amino function is on average 15 (trade name Ethomeen C 25, Akzo). 0.05 g of the bisglycidyl ether of bisphenol A (trade name Epikote 828 LVEL, Hexion) in solution in 117 g of acetone is dispersed uniformly in the mixture, with stirring, and a clear, spreadable pressure-sensitive adhesive solution is obtained by stirred introduction of 39 g of water.

Example 6

Base Polymer from Example 5 with Additive

The composition described in Example 5.2 is additionally blended with 2.92 g of diammonium hydrogen phosphate.

Example 7

Base Polymer from Example 5 with Additive

The composition described in Example 5.2 is additionally blended with 2.92 g of Kappafos D11.

Example 8

Inventive Composition 2 (Base Polymer from Example 5 with Additive)

The composition described in Example 5.2 is additionally blended with 2.92 g of orthophosphoric acid.

Example 9

Reference Composition 3

9.1 Preparation of a Hydrophilic Scaffold Polymer

A vacuum-tight polymerization apparatus with a capacity of 2 l, corresponding to Example 1, is charged with 225 g of acrylic acid, 202.5 g of 2-ethylhexyl acrylate, 400 g of acetone and 50 g of ethanol. Following evacuation, flushing with nitrogen and heating to 62° C., a solution of 0.5 g of 2,2-azobis(2-methylbutyronitrile) in 8 g of acetone is introduced with stirring into the reaction medium, which boils at 650 hPa. The polymerization begins, with a slowly falling boiling temperature and an increasing viscosity of the reaction mixture. After a reaction time of 50 minutes, at 58° C., a further 0.5 g of 2,2-azobis(2-methylbutyronitrile) are added, in solution in 150.0 g of acetone and 25.0 g of ethanol. The polymerization is continued with the reaction mixture boiling at 60° C. and 800 hPa. After a further 100 minutes of reaction time, 150.0 g of acetone and 25 g of ethanol are added as diluents and the pressure is adjusted to atmospheric pressure. The polymerization is continued with boiling at 59° C.-60° C. for a further 180 minutes. Thereafter, at 60° C., a solution of 22.5 g SPA in 127.5 g of demineralized water is metered at the same time as a fine-particled dispersion of 4 g of bis(4-tert-butylcyclohexyl) peroxydicarbonate in 6 g of water, within a period of 120 minutes, the metered addition taking place into the boiling reaction mixture. The reaction is ended at 61° C. with a total reaction time of 20 hours. As in Example 1, an inert atmosphere is ensured in the reaction chamber during the polymerization. After cooling, the polymer solution is diluted with 175 g of demineralized water and 50 g of ethanol.

The polymer content is 30.07% by weight; the relative viscosity, measured in 4.00:1.20 methanol/water at 25° C., is 2.500.

9.2 Preparation of a Pressure-Sensitive Adhesive 94.8 g (28.5 g of polymer) of the polymer solution prepared in accordance with 9.1 are mixed with 60.4 g of the water-soluble plasticizer described in Example 5 under 5.2. This mixture is admixed with a solution of 8.0 g of a tackifier resin (unesterified rosin with an acid number in the region of 170) in 66.7 g of acetone. Prior to coating, a solution of 0.094 g of the bisglycidyl ether of bisphenol A (trade name Epikote 828 LVEL, Hexion) in 10 g of acetone is dispersed uniformly in the mixture.

Example 10

Base Polymer from Example 9 with Additive

The composition described in Example 9.2 is additionally blended with 0.855 g of diammonium hydrogen phosphate.

Example 11

Base Polymer from Example 9 with Additive

The composition described in Example 9.2 is additionally blended with 0.855 g of Kappafos D11.

Example 12

Inventive Composition 3 (Base Polymer from Example 9 with Additive)

The composition described in Example 9.2 is additionally blended with 0.855 g of orthophosphoric acid.

Measurements

The pressure-sensitive adhesives prepared in Examples 1-12, in the form of a 30% strength solution in a 1:1:1 mixture of water, isopropanol and acetone, were coated onto siliconized release paper. After 120-minute conditioning at room temperature the swatch specimens were dried at 100° C. for 20 minutes. The coatweight after drying was 40 g/m². These specimens were laminated to paper containing calcium carbonate. The investigations were carried out using a paper from the company Drewsen SPEZIALPAPIERE GmbH & Co. KG, with the trade name "PRODURA Basispapier mit hoher Spaltfestigkeit" [PRODURA base paper with high split resistance]. Adhesive investigation took place in each case both on fresh specimens (instantaneous measurement) and on specimens which had been stored in a controlled-climate cabinet at 40° C. and 80% relative humidity (4-week measurement). Prior to the investigations the specimens were each conditioned for 3 days at 23° C. and 50% relative humidity.

Bond Strength Test (Test A)

The bond strength was determined as follows:

As a defined adhesion substrate, a label paper treated to make it pressure-sensitively adhesive on one side was mounted by its adhesive side onto a steel plate. As the sample for investigation, a strip of the above-described specimens 20 mm wide was pressed under load (2 kg) onto the adhesion substrate. Immediately thereafter the adhesive tape was peeled from the adhesion substrate at a rate of 300 mm/min and at an angle of 180°, and a measurement was made of the force required to achieve this at room temperature. The measurement value (in N/cm) was obtained as an average value from three individual measurements.

Microshear Travel Test (Test B)

This test is used to test the shear strength of adhesive tapes under a temperature load of 40° C.

Measurement Sample Preparation:

As the sample for investigation, a strip of the above-described specimens was adhered to a polished steel test plate cleaned with acetone and amenable to temperature conditioning, and was then rolled on six times using a 2 kg steel roller and a speed of 10 m/min. The bond area of the sample was 13 mm×10 mm [height×width]; the sample was suspended vertically, overhung the steel test plate by 2 mm at the top edge, and was reinforced flush with a stable adhesive strip which served as a support for the travel gauge.

Measurement:

The sample for measurement was loaded at the bottom end with a 100 g weight. The steel test plate bearing the adhered sample was temperature-conditioned to 40° C. The travel gauge was used to measure the deformation of the sample over a period of 15 minutes. Testing took place at an ambient temperature of 23±3° C. and a relative humidity of 50±5%.

Rolling-Ball Tack (Test C)

The rolling-ball tack was measured by the PSTC-6 method (Test Methods for Pressure Sensitive Adhesive Tapes, 15th Edition; publisher: Pressure Sensitive Tape Council, Northbrook (Ill.), USA), with the following modifications being undertaken:

use of stainless steel ball bearings (stainless steel 1.4401), diameter 7/16 inch, mass 5.7 g preparation of the balls:

thorough cleaning with cotton wool and acetone; prior to the measurement series, the clean balls are stored in an acetone bath for 15 minutes (balls shall be completely surrounded by acetone); at least 30 minutes before the beginning of measurement, the balls are taken from the acetone bath and stored uncovered in the test conditions for drying and conditioning each ball is used only for one measurement.

Repulpability (Test D)

The determination was made on the specimens produced as described above in accordance with TAPPI UM 213 (TAPPI Useful Methods 213, TAPPI 1991; ISBN 0898522064).

Results

Repulpability

For all of Examples 1 to 12 it was found, with specimens produced specifically for the purpose as described above, that they are repulpable in accordance with the TAPPI UM 213 measurement method and remain so even after four-week storage.

Bond Strengths, Shear Strength

Table 1 sets out the adhesive properties.

TABLE 1

| Example | Base adhesive + additive | Corresponds to EP 1 935 956 A2 | Bond strength (Test A) [N/cm] | | Microshear travel (Test B) [μm] | | Rolling-ball tack (Test C) [mm] | |
|---|---|---|---|---|---|---|---|---|
| | | | instantaneous | 4 weeks | instantaneous | 4 weeks | instantaneous | 4 weeks |
| 1 | | 1 | 3.3 | 0.8 | 91 | 19 | 27 | 172 |
| 2 | 1 + AP | 4 | 3.2 | 3.3 | 95 | 87 | 79 | 84 |
| 3 | 1 + D11 | 5 | 3.2 | 3.1 | 101 | 93 | 88 | 86 |
| 4 | 1 + PA | | 3.3 | 3.2 | 109 | 103 | 28 | 33 |
| 5 | | 2 | 3.1 | 1.5 | 195 | 19 | 76 | 237 |
| 6 | 5 + AP | 6 | 3.3 | 3.3 | 176 | 158 | 164 | 171 |
| 7 | 5 + D11 | 7 | 3.2 | 3.4 | 181 | 159 | 178 | 170 |
| 8 | 5 + PA | | 3.5 | 3.4 | 169 | 173 | 72 | 75 |
| 9 | | 3 | 3.1 | 1.2 | 186 | 27 | 40 | 216 |
| 10 | 9 + AP | 8 | 3.4 | 3.3 | 195 | 208 | 82 | 90 |
| 11 | 9 + D11 | 9 | 3.0 | 3.1 | 212 | 178 | 116 | 110 |
| 12 | 9 + PA | | 3.0 | 3.0 | 199 | 209 | 38 | 40 |

AP = Diammonium hydrogen phosphate
D11 = Kappafos D11
PA = Orthophosphoric acid
Figures printed in bold: inventive examples
Figures printed normally: comparative examples It is possible to show that the additization of the adhesives with phosphoric acid possesses a stabilizing effect, with regard to the loss of bond strength over time and to the cohesion behaviour (microshear travel measurement), which is equal to that of the additization of the same compositions with the additives as disclosed in EP 1 935 956 A2. With regard to the tack, shown by the values of the rolling-ball tack measurement, it is found, in contrast to the comparative examples, that through the additization with phosphoric acid there is no deterioration in the initial value, when comparison is made with the unadditized base compositions and the value in the long-term measurement remains constant.

This result was completely surprising and could not have been derived or even inferred from the knowledge of the behaviour of the adhesives as were known from EP 1 935 956 A2.

The invention claimed is:

1. Repulpable pressure-sensitive adhesive comprising:
   (a) at least one copolymer of (meth)acrylic acid with an ester of (meth)acrylic acid, wherein the amount of (meth)acrylic acid in said copolymer amounts to more than 20% by weight, based on the weight of the pressure-sensitive adhesive; and
   (b) 2-5% by weight, based on the pure phosphoric acid content of the pressure-sensitive adhesive, of orthophosphoric acid;
wherein said pressure-sensitive adhesive exhibits improved tack stability compared to a comparison pressure-sensitive adhesive having an adhesive composition identical to said pressure-sensitive adhesive except that said comparison pressure-sensitive adhesive has instead of said orthophosphoric acid an identical content of either (i) diammonium hydrogen phosphate or (ii) a mixture of sodium polyphosphate and alkylphosphonate, and wherein the tack stability of both said pressure-sensitive adhesive and said comparison pressure-sensitive adhesive are measured instantaneously and after four weeks in Rolling-Ball Tack Test C against a base pressure-sensitive adhesive having an adhesive composition identical to said pressure-sensitive adhesive except that said base pressure-sensitive adhesive lacks said orthophosphoric acid.

2. Adhesive tape with repulpability properties, comprising at least one layer of an adhesive according to claim 1.

3. A method for adhesively bonding filler-containing materials, said method comprising bonding said materials with an adhesive tape according to claim 2.

4. A method of splicing two materials, said method comprising splicing the materials with an adhesive tape according to claim 2.

5. Adhesive according to claim 1, wherein the amount of (meth) acrylic acid in the copolymer in (a) amounts to more than 70% by weight, relative to a total weight of the pressure-sensitive adhesive.

6. Adhesive according to claim 1, which exhibits improved tack stability compared to a comparison pressure-sensitive adhesive having an adhesive composition identical to said pressure-sensitive adhesive except that said comparison pressure-sensitive adhesive has instead of said orthophosphoric acid an identical content of a mixture of sodium polyphosphate and alkylphosphonate exhibiting a calcium-binding capacity of 120 mg CaO/g of the mixture, and wherein the tack stability of both said pressure-sensitive adhesive and said comparison pressure-sensitive adhesive are measured instantaneously and after four weeks in Rolling-Ball Tack Test C against a base pressure-sensitive adhesive having an adhesive composition identical to said pressure-sensitive adhesive except that said base pressure-sensitive adhesive lacks said orthophosphoric acid.

7. Adhesive according to claim 1, wherein the amount of (meth)acrylic acid in the copolymer in (a) amounts to more than 80% by weight, relative to a total weight of the pressure-sensitive adhesive.

8. Adhesive according to claim 7, wherein (a) is a copolymer of acrylic acid and 2-ethylhexyl acrylate.

9. Adhesive according to claim 7, wherein (a) is a copolymer of acrylic acid, butyl acrylate and vinylcaprolactam.

10. Adhesive according to claim 7, wherein (a) is a copolymer of acrylic acid and at least one (meth)acrylate monomer selected from the group consisting of alkyl acrylate, alkyl methacrylate, 2-ethoxalyloxyethyl methacrylate and 2-ethoxyethyl acrylate.

11. Repulpable pressure-sensitive adhesive comprising:
    (a) at least one copolymer of (meth)acrylic acid with an ester of (meth)acrylic acid, wherein the amount of (meth)acrylic acid in said copolymer amounts to more than 80% by weight, based on the weight of the pressure-sensitive adhesive, and wherein said copolymer is selected from the group consisting of:
       (i) copolymers of acrylic acid and 2-ethylhexyl acrylate;
       (ii) copolymers of acrylic acid, butyl acrylate and vinylcaprolactam; and
       (iii) copolymers of acrylic acid and at least one (meth)acrylate monomer selected from the group consisting of alkyl acrylate, alkyl methacrylate, 2-ethoxalyloxyethyl methacrylate and 2-ethoxyethyl acrylate; and
    (b) 2-5% by weight, based on the pure phosphoric acid content of the pressure-sensitive adhesive, of orthophosphoric acid;
wherein said pressure-sensitive adhesive exhibits improved tack stability compared to a comparison pressure-sensitive adhesive having an adhesive composition identical to said pressure-sensitive adhesive except that said comparison pressure-sensitive adhesive has instead of said orthophosphoric acid an identical content of either (i) diammonium hydrogen phosphate or (ii) a mixture of sodium polyphosphate and alkylphosphonate, and wherein the tack stability of both said pressure-sensitive adhesive and said comparison pressure-sensitive adhesive are measured instantaneously and after four weeks in Rolling-Ball Tack Test C against a base pressure-sensitive adhesive having an adhesive composition identical to said pressure-sensitive adhesive except that said base pressure-sensitive adhesive lacks said orthophosphoric acid.

12. Adhesive according to claim 11, which exhibits improved tack stability compared to a comparison pressure-sensitive adhesive having an adhesive composition identical to said pressure-sensitive adhesive except that said comparison pressure-sensitive adhesive has instead of said orthophosphoric acid an identical content of a mixture of sodium polyphosphate and alkylphosphonate exhibiting a calcium-binding capacity of 120 mg CaO/g of the mixture, and wherein the tack stability of both said pressure-sensitive adhesive and said comparison pressure-sensitive adhesive are measured instantaneously and after four weeks in Rolling-Ball Tack Test C against a base pressure-sensitive adhesive having an adhesive composition identical to said pressure-sensitive adhesive except that said base pressure-sensitive adhesive lacks said orthophosphoric acid.

* * * * *